United States Patent [19]
Hegg et al.

[11] Patent Number: 5,363,241
[45] Date of Patent: Nov. 8, 1994

[54] FOCUSABLE VIRTUAL IMAGE DISPLAY

[75] Inventors: Ronald G. Hegg, Los Angeles; Mao-Jin Chern, Rancho Palos Verdes, both of Calif.

[73] Assignee: Hughes Aircraft Company, Los Angeles, Calif.

[21] Appl. No.: 864,860

[22] Filed: Apr. 7, 1992

[51] Int. Cl.$^5$ .............................................. G02B 15/14
[52] U.S. Cl. ..................................... 359/676; 359/462
[58] Field of Search .................... 359/676, 462, 683

[56] References Cited
U.S. PATENT DOCUMENTS
4,953,958  9/1990  Katsuma et al. ................... 359/676

Primary Examiner—Scott J. Sugarman
Attorney, Agent, or Firm—Leonard A. Alkov; W. K. Denson-Low

[57] ABSTRACT

A focusable virtual image display system employing a focusable image source such as a cathode ray tube and imaging optics to provide a virtual image. The virtual image is viewable by a user and its effective range may be changed without changing the apparent field of view or resolution. By placing the focus point of the imaging optics at the design eye, the image source is moved backwards and forwards, thus effectively changing the range of the virtual image observed by the user without changing the apparent field of view or resolution. The present invention allows the user to adjust the focus position of the virtual image of the image source by moving it relative to the imaging optics, while maintaining the size and resolution of the image. If the user wants to move the image further away, when the image source is moved, the imaging optics moves the virtual image further away and magnifies the image such that the angular field of view stays the same. The user cannot distinguish between the sizes, although the focus will be more comfortable for a particular accommodation range. The relative cost of the virtual image display system is relatively less expensive than large screen monitors due to the nature and complexity of the smaller components. By including a focus adjustment mechanism, the focusable virtual image display monitor has an added feature that a conventional large screen monitor does not provide.

29 Claims, 2 Drawing Sheets

FOCUSABLE VIRTUAL IMAGE DISPLAY

BACKGROUND

The present invention relates generally to virtual image display systems, and more particularly, to a virtual image display system with variable magnification.

Workstation and PC monitors today provide an image that is stationary with respect to the viewer. If the focus accommodation in the user's vision (corrected or not) is limited, then the user must either use bifocals or must try to move the monitor to a better focus position (albeit a worse physical position).

The color and large screen monitor market for work stations as personal computers is relatively large. Yet the price of large screen monitors is relatively high. Also the monitor size is quite large. Furthermore, the large size of these monitors makes them difficult to move to a comfortable viewing position if more than one person uses the workstation, or if the user is not visually comfortable with the current physical position.

Therefore, it would be an advance in the monitor art to have a video monitor system that provides a large screen image but is not physically large in size. It would be a further advance in the art to have a larger screen monitor with the display screen size variable in size and distance to the user to achieve a comfortable viewing condition.

SUMMARY OF THE INVENTION

In order to provide for the above advances, the present invention comprises a virtual image display system or monitor with variable magnification and variable image distance to a user, wherein a focusable image source such as a cathode ray tube (CRT) is employed with magnifying optics to provide for a virtual image. The virtual image is viewable by a user and whose effective range may be changed without changing the apparent field of view or resolution. By placing the focus point of the imaging optics of the virtual image display system at the design eye (the nominal user eye position), the image source, or the magnifying optics, may be moved backwards and forwards, thus giving the effect of changing the range of the virtual image observed by the user without changing the apparent field of view or resolution.

The present invention allows the user to adjust the focus position of the virtual image of the image produced by the image source (by moving the image source relative to the imaging optics), yet maintain the size and resolution of the image. In other words, if the user wants to move the image further away, when the image source is moved, the imaging optics moves the virtual image further away and magnifies the image such that the angular field of view stays practically the same. The user cannot easily distinguish between the sizes, although the focus will be more comfortable for the particular accommodation range.

The present invention thus provides for a virtual image display system that provides a large image without a large image source (CRT). The relative cost of the virtual image display system is relatively less expensive than large screen direct view monitors due to the nature and complexity of the smaller components. By including a focus adjustment mechanism, the virtual image display monitor with variable magnification has an added feature that a conventional large screen direct view monitor or CRT does not provide.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
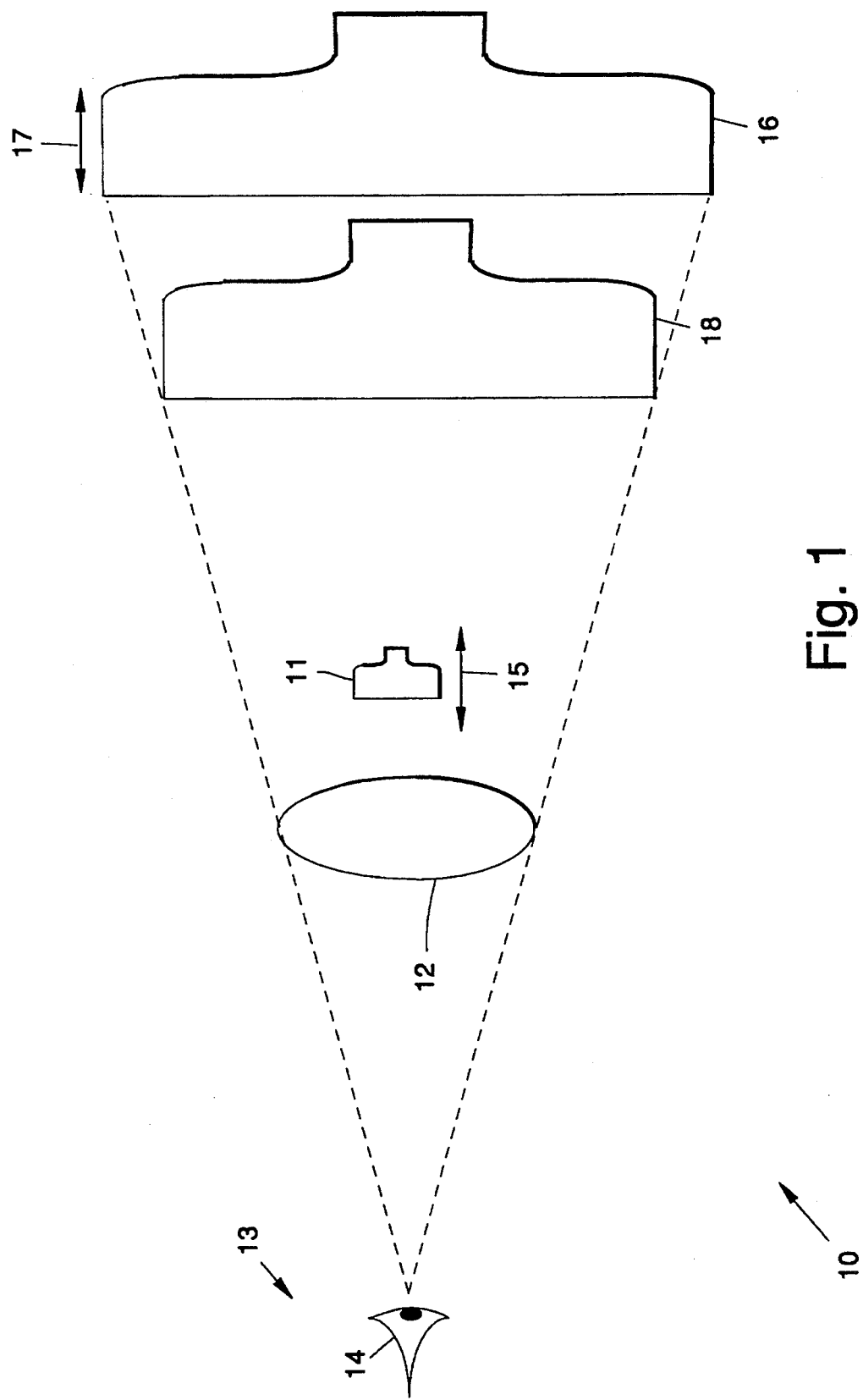
FIG. 1 shows an illustration of an focusable virtual image display system in accordance with the principles of the present invention.

Referring to the drawing figures, FIG. 1 shows an illustration of an focusable virtual image display system 10 in accordance with the principles of the present invention. The focusable virtual image display system 10 comprises an image source 11, such as a small screen cathode ray tube (CRT) or liquid crystal display (LCD), for example, and imaging optics 12 disposed between the image source 11 and a user 13. The image source 11 is movable along the optical line of sight of the user 13, as is indicated by the arrow 15. The user's eyes 14 view an image displayed by the image source 11 through the imaging optics 12. The relative motion of the focusable image source 11 creates a plurality of virtual magnified images 16, 18 whose relative positions move relative to the user 13, as is indicated by the arrow 17.

More specifically, the user's eye 14 is positioned at a position of the approximate focal length of the imaging optics 12 which forms an eye piece 12. It is to be understood that the imaging optics 12 may be a magnifying lens or a concave mirror. The image source 11 comprising the CRT or LCD display, is placed at the proper distance from the imaging optics 12 to produce a virtual magnified image 16. For example, if the eye relief (the distance from the imaging optics 12 to the eye 14) is set at 24 inches (a comfortable distance), then the focal length of the imaging optics 12 is 24 inches. As the imaging source 11 behind the imaging optics 12 is moved, the virtual image distance changes from 24 inches (with the image source 11 disposed against the imaging optics 12) to infinity (with the image source 11 disposed at the focal length of the imaging optics 12, and which is a distance of 24 inches back from the location of the imaging optics 12). However, the angular size of the virtual image 16 always remains the same, and is given by the equation FOV=atan(CRT $\phi$/24 inches), where $\phi$ is angular subtence of the CRT.

Figure 2:
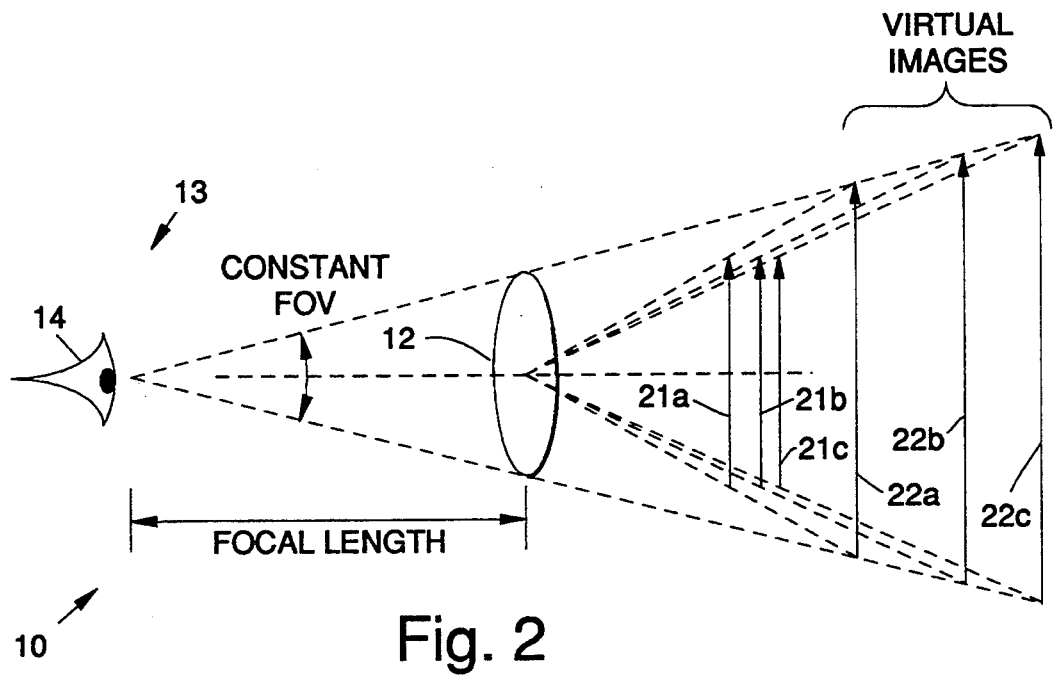
FIG. 2 shows the effects of focus adjustment in the virtual image display system of FIG. 1.

FIG. 2 shows the effects of focus adjustment in the virtual image display system 10 of FIG. 1. As the focusable image source 11 is moved, as is illustrated by the three small vertical arrows 21a, 21b, 21c, the position of the corresponding virtual image of the small vertical arrows 21a, 21b, 21c is changed, as is illustrated by the three large vertical arrows 22a, 22b, 22c, respectively.

Figure 3:
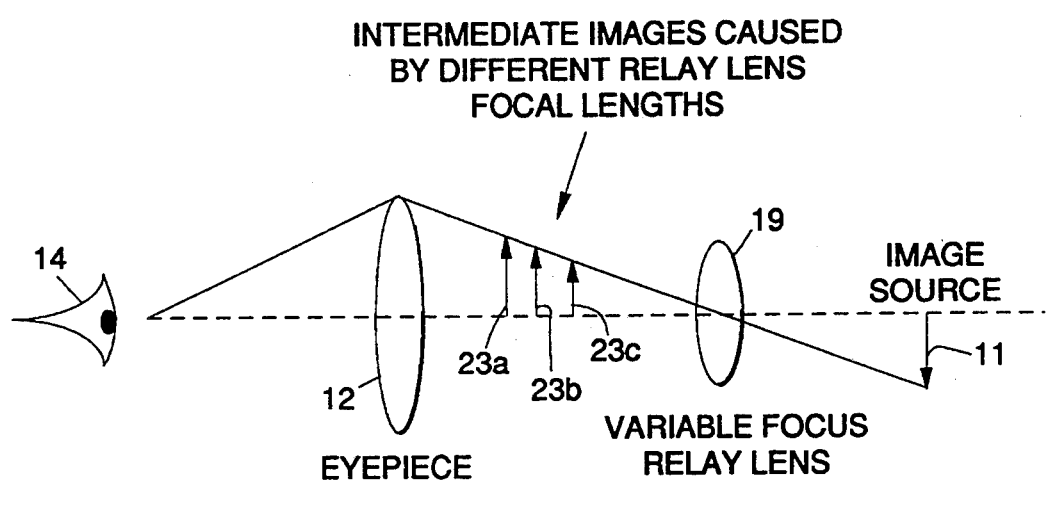
FIG. 3 shows an illustration of an embodiment of the focusable virtual image display system employing a variable focus relay lens.

FIG. 3 illustrates of an embodiment of the focusable virtual image display system employing a variable focus relay system 19 or lens 19 as part of the imaging optics 12. Using the relay system 19 in order to produce a pupil at the design eye, then both the relay system 19 and the image source 11 must move together to produce the above-described virtual image effect. This motion has the effect of moving the intermediate image, illustrated by the three vertical arrows 23a, 23b, 23c in FIG. 3, closer or farther from the imaging optics 12 (eye piece).

When using the relay system 19 it is also possible to keep the image source 11 fixed, and use a zoom relay system 19 (having a variable focal length) to change the position of the intermediate image. By doing this, the focal length of the imaging optics 12 (eyepiece) need not be the eye relief distance. However, the zoom relay lens system 19 must maintain its exit pupil position as it changes focal length in order to maintain the correct design eye position.

Thus there has been described a new and improved a focusable virtual image display system. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A focusable virtual image display optical system that is adapted to enlarge an image of an image source viewed by a user, said system comprising:
   a movable cathode ray tube image source; and
   imaging optics disposed along an optical path between the movable cathode ray tube image source and the user, and that is adapted to produce a virtual magnified image of the movable cathode ray tube image source at the location of the user.

2. The virtual image display optical system of claim 1 wherein the imaging optics comprises a convex lens.

3. The virtual image display optical system of claim 1 wherein the imaging optics comprises a concave mirror.

4. The virtual image display optical system of claim 1 wherein the imaging optics further comprises a variable focus relay lens.

5. The virtual image display optical system of claim 1 wherein the imaging optics comprises a convex lens and a variable focus relay lens.

6. The virtual image display optical system of claim 1 wherein the movable cathode ray tube image source comprises a liquid crystal display.

7. A focusable virtual image display optical system that is adapted to enlarge an image of an image source viewed by a user, said system comprising:
   a movable liquid crystal display image source; and
   imaging optics disposed along an optical path between the movable liquid crystal display image source and the user, and that is adapted to produce a virtual magnified image of the movable liquid crystal display image source at the location of the user.

8. The virtual image display optical system of claim 7 wherein the imaging optics comprises a convex lens.

9. The virtual image display optical system of claim 7 wherein the imaging optics comprises a concave mirror.

10. The virtual image display optical system of claim 7 wherein the imaging optics further comprises a variable focus relay lens.

11. The virtual image display optical system of claim 7 wherein the imaging optics comprises a convex lens and a variable focus relay lens.

12. A virtual image display optical system having variable magnification comprising:
    an image source; and
    magnifying optics disposed along an optical path between the image source and a user, and that is adapted to produce variable magnification of the image source, and wherein the variable magnification is achieved by providing a selected combination of relative motion of the image source and relative postion of optical elements comprising the magnifying optics, wherein the magnification change is achieved by moving the position of the image source.

13. The virtual image display optical system of claim 12 wherein the magnifying optics comprises a plurality of optical elements and wherein magnification change is achieved by moving the relative position of at least one of the optical elements.

14. The virtual image display optical system of claim 12 wherein the imaging optics further comprises variable focal length optics.

15. A virtual image display optical system having variable magnification comprising:
    an image source; and
    magnifying optics disposed along an optical path between the image source and a user, and that is adapted to produce variable magnification of the image source, and wherein the variable magnification is achieved by providing a selected combination of relative motion of the image source and relative position of optical elements comprising the magnifying optics, wherein the optics comprises a convex lens and a variable focus relay lens.

16. The virtual image display optical system of claim 15 wherein the magnifying optics comprises a plurality of optical elements and wherein magnification change is achieved by moving the relative position of at least one of the optical elements.

17. The virtual image display optical system of claim 15 wherein the imaging optics further comprises variable focal length optics.

18. A virtual image display optical system having variable magnification comprising:
    an image source comprising a small screen cathode ray tube: and
    magnifying optics disposed along an optical path between the image source and a user, and that is adapted to produce variable magnification of the image source, and wherein the variable magnification is achieved by providing a selected combination of relative motion of the image source and relative position of optical elements comprising the magnifying optics.

19. The virtual image display optical system of claim 18 wherein the magnifying optics comprises a plurality of optical elements and wherein magnification change is achieved by moving the relative position of at least one of the optical elements.

20. The virtual image display optical system of claim 18 wherein the imaging optics further comprises variable focal length optics.

21. A virtual image display optical system having variable magnification comprising:
    an image source comprising a liquid crystal display; and
    magnifying optics disposed along an optical path between the image source and a user, and that is adapted to produce variable magnification of the image source, and wherein the variable magnification is achieved by providing a selected combination of relative motion of the image source and relative position of optical elements comprising the magnifying optics.

22. The virtual image display optical system of claim 21 wherein the magnifying optics comprises a plurality of optical elements and wherein magnification change is achieved by moving the relative position of at least one of the optical elements.

23. The virtual image display optical system of claim 21 wherein the imaging optics further comprises variable focal length optics.

24. A virtual image display optical system having variable magnification comprising:
   an alphanumeric image source; and
   magnifying optics disposed along an optical path between the image source and a user, and that is adapted to produce variable magnification of the image source, and wherein the variable magnification is achieved by providing a selected combination of relative motion of the image source and relative position of optical elements comprising the magnifying optics.

25. The virtual image display optical system of claim 24 wherein the magnifying optics comprises a plurality of optical elements and wherein magnification change is achieved by moving the relative position of at least one of the optical elements.

26. The virtual image display optical system of claim 24 wherein the imaging optics further comprises variable focal length optics.

27. A virtual image display optical system having variable magnification comprising:
   a segmented image source; and
   magnifying optics disposed along an optical path between the image source and a user, and that is adapted to produce variable magnification of the image source, and wherein the variable magnification is achieved by providing a selected combination of relative motion of the image source and relative position of optical elements comprising the magnifying optics.

28. The virtual image display optical system of claim 27 wherein the magnifying optics comprises a plurality of optical elements and wherein magnification change is achieved by moving the relative position of at least one of the optical elements.

29. The virtual image display optical system of claim 27 wherein the imaging optics further comprises variable focal length optics.

* * * * *